Sept. 30, 1930.  G. W. BLAIR  1,776,847
QUICK OPERATING FASTENER
Filed Dec. 22, 1924  3 Sheets-Sheet 1
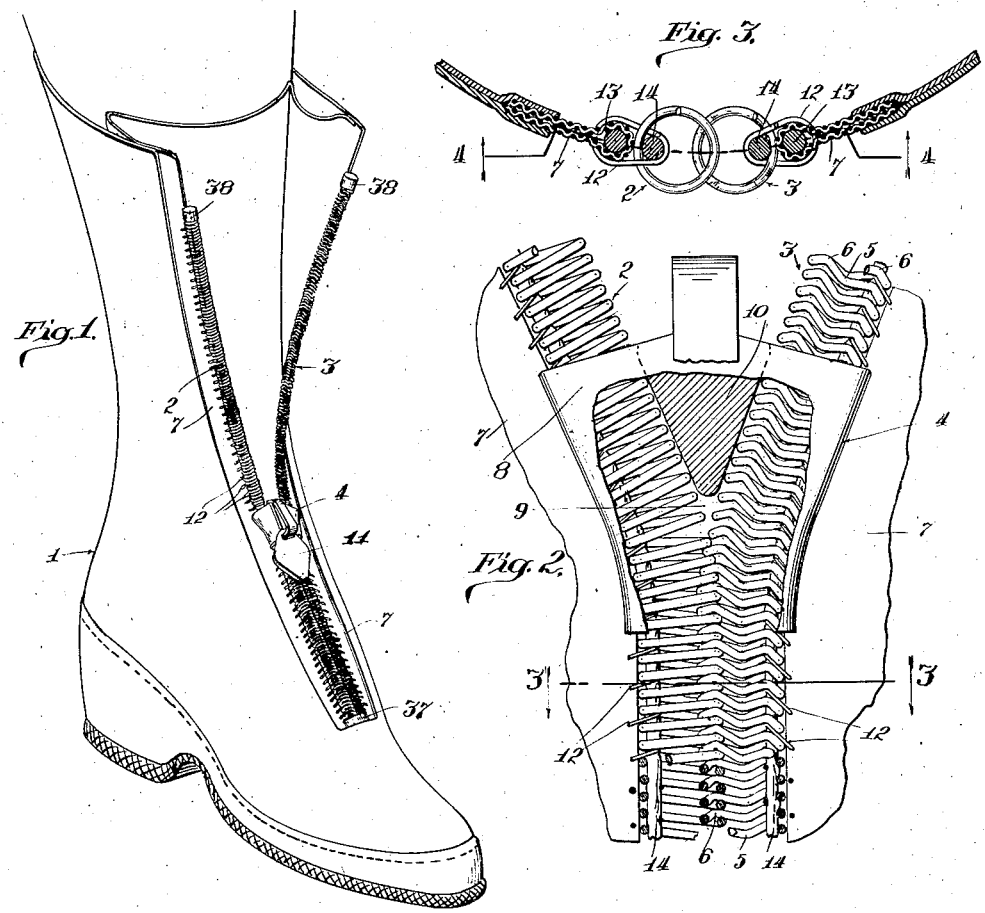
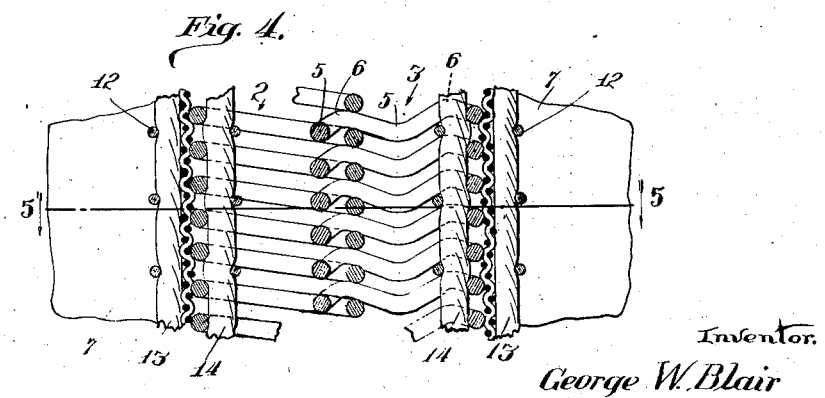

Sept. 30, 1930. G. W. BLAIR 1,776,847
QUICK OPERATING FASTENER
Filed Dec. 22, 1924   3 Sheets-Sheet 2

Inventor,
George W. Blair
By Fisher, Fowle, Clark & Evans
Attorneys.

Sept. 30, 1930.   G. W. BLAIR   1,776,847
QUICK OPERATING FASTENER
Filed Dec. 22, 1924    3 Sheets-Sheet 3
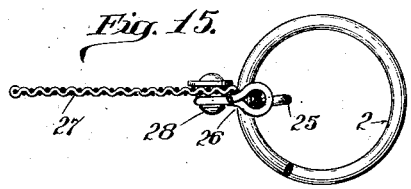
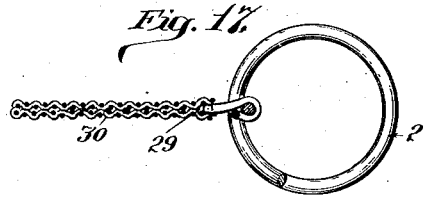
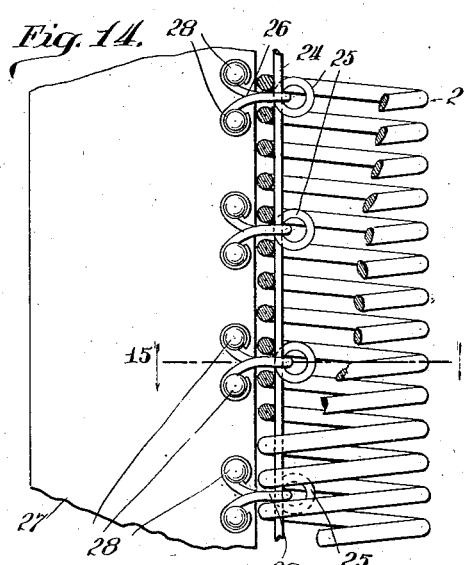
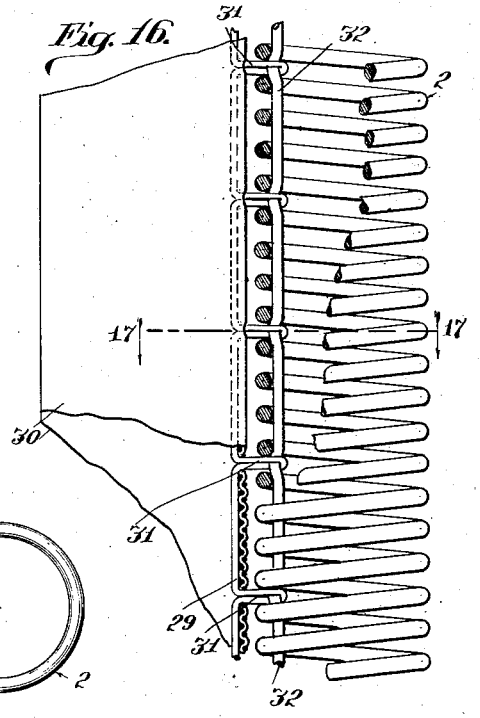
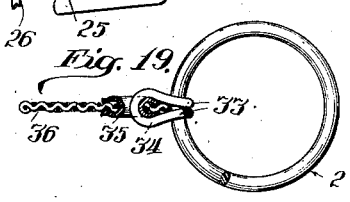
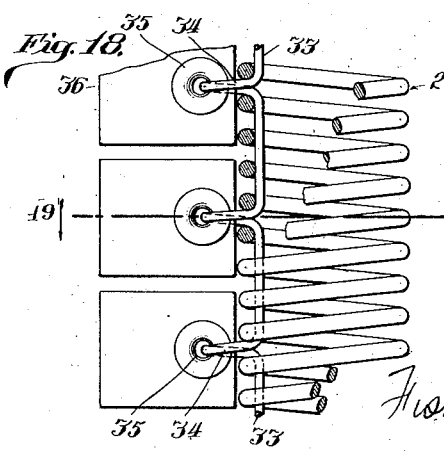
Inventor
George W. Blair

Patented Sept. 30, 1930

1,776,847

UNITED STATES PATENT OFFICE

GEORGE W. BLAIR, OF MISHAWAKA, INDIANA, ASSIGNOR TO MISHAWAKA RUBBER & WOOLEN MANUFACTURING COMPANY, OF MISHAWAKA, INDIANA, A CORPORATION OF INDIANA

QUICK-OPERATING FASTENER

Application filed December 22, 1924. Serial No. 757,321.

My invention relates to fasteners of the type wherein elements which extend along the edges of the parts which are to be connected, are interlocked and released by movement of a slider therealong, and has reference more particularly to fasteners wherein the fastening elements comprise elongated coiled members which are interlocked by nesting the coils of one of the elements between the coils of the other element.

The principal objects of my invention are to provide an improved coiled fastener element; to afford a positive connection between coiled elements, without requiring sharp bends which would tend to weaken the wire; to construct the coiled element with a plurality of interlocking points therearound, affording interlocking engagement practically at any place around the coil; to prevent shifting or creeping action of the coiled fastener element on the tape or fabric on which the element is mounted; and in general, to provide a simple, inexpensive and positive fastener of the quick operating type which is extremely flexible and will not accidentally come apart.

On the drawings:

Fig. 1 is a perspective view of an overshoe with my improved fastener applied thereto;

Fig. 2 is an enlarged fragmentary front view of the fastener shown in Fig. 1, with the slider for operating same, partly broken away;

Fig. 3 is a sectional view on the line 3—3 of Fig. 2;

Fig. 4 is an enlarged sectional view on the line 4—4 of Fig. 3;

Figure 12:
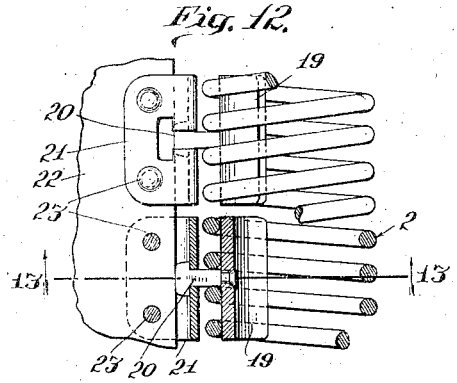

Figs. 12, 14, 16 and 18, are fragmentary side views, partly in section, showing other forms of mounting; and Figs. 13, 15, 17 and 19, are sectional views respectively, on the lines 13—13 of Fig. 12; 15—15 of Fig. 14; 17—17 of Fig. 16 and 19—19 of Fig. 18.

Referring to the drawings in which I have shown my invention as applied to an overshoe, although it is to be understood that it is not limited to such use, the reference numeral 1 indicates an overshoe which opens down the front, and has the fastener elements 2 and 3 secured to and extending along the front edges of the side portions of the overshoe and adapted to be interlocked and released by the slider 4. Each of the elements 2 and 3 consists of a coil spring made of a wire of suitable size so that the coils are substantially rigid, while the spring itself is quite flexible, and the springs are wound so that the coils of each spring are separated sufficiently to admit the coils of the other spring therebetween. These springs 2 and 3 are preferably wound right and left, so that the enmeshing portions thereof are in parallel planes, as this avoids distorting which would occur if both springs were either right or left hand windings.

The element 2 is preferably plain, that is, in the form of an ordinary coiled spring, whereas the element 3 is formed so that each coil thereof comprises a plurality of reversely extending wave-like formations 5 and 6 respectively, which are in line with corresponding wave-like formations of the other coils of the element 3.

The elements 2 and 3 are secured to the edges of tapes 7 or other fabric parts, the element 3 being preferably positioned so that the crimps or wave elements which are diametrically opposite the point of attachment to the tape 7 and which interlock with the coils of the element 2, extend in a direction opposite to the direction of movement of the slider as the latter is operated to interlock the elements 2 and 3, that is, said crimps or waves extend downwardly as indicated at 5, as this arrangement tends to facilitate meshing and releasing of the coils.

The slider 4 is somewhat the same form as those now employed in connection with quick operating fasteners, and comprises front and rear plates 8 and 9 respectively, which are connected together and held in spaced relation by a V-shaped member 10, and the outer edges of the plates 8 and 9 are inturned to partially embrace the elements 2 and 3, and form with the V-shaped member 10, divergent channels for guiding the elements 2 and 3 to the meshing position and directing same outwardly in the releasing operation. A finger grip 11 is attached to the outside of the slider 4 for convenient manipulation of same. The lower ends of the elements 2 and 3 are connected together by a clip 37, and a stop 38 is provided at the upper end of each element 2 and 3 to limit the upward movement of the slider 4.

The fastener elements 2 and 3, as hereinbefore indicated, are secured to tapes 7 and the latter are secured to the sides or quarters of the overshoe, although it is to be understood that the fastener elements may be attached directly to the parts which are to be connected, without using the tapes. The elements 2 and 3 may be secured to the tape or fabric in various ways, as for example, by a wire 12, which is passed between the coils of the element 2 or 3 and threaded through the adjoining edge of the fabric. When a tape 7 is employed, it is preferred to double the tape back over a cord 13 so that the latter is in the folded edge of the tape, or the cord 13 may be woven into the tape 7, to form a beaded edge back of which the wire 12 is passed. It is also preferred to insert a cord 14 in the spiral or coiled element 2 or 3 and engage the wire 12 around same, although the cord 14 may be omitted and the wire 12 engaged directly with the wire of the element 2 or 3. This wire 12 when so arranged forms a series of loops on the edge of the tape which engage around the cord in the coiled element 2 or 3 and hold the element securely in place on the edge of the mounting tape.

Figure 9:
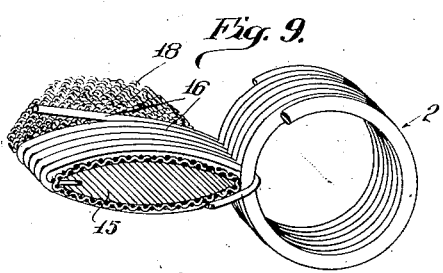
Figs. 9, 10 and 11, are perspective views, showing three successive steps in a modified form of mounting for the coiled elements.
Figure 10:
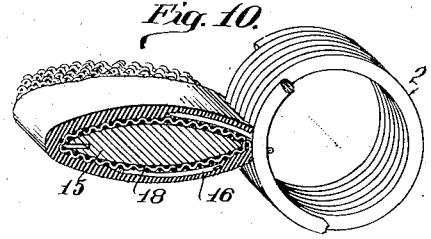
Figure 11:
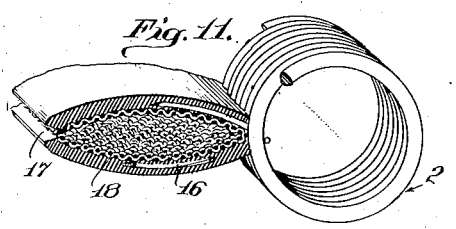

The elements 2 and 3 may also be attached to a tape-like element as shown in Figs. 9, 10 and 11, laying the element along the edge of a form 15 and winding a thread or cord 16 around the form and between the adjoining coils of the element. After winding, a cementitious substance may be applied to the cords 16 on the form to combine the threads into a unitary structure, after which the cords are severed along the edge of the form remote from the element 2 or 3 as indicated at 17. A layer of fabric 18 may be applied to the form 15, if desired, before winding the cord 16 thereon to afford a backing or longitudinal reinforcing between the cords, which is combined with the cords when the cementitious material is applied. After the cords 16 are severed, the two side portions of the resultant structure may be cemented or fastened together in any convenient manner.

Figure 13:
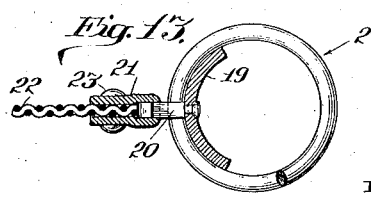

The elements 2 and 3 may also be attached to the fabric as shown in Figs. 12 and 13, by a plurality of substantially semi-cylindrical inserts 19, which are placed at intervals in the elements 2 or 3 and provided with projections or pins 20, extending outwardly between certain coils and having their outer extremities secured to plates 21 which embrace the edge of the fabric or tape 22 and are secured thereto by any suitable fasteners 23.

Figs. 14 and 15 show another arrangement for fastening the coiled elements 2 or 3 onto a tape or fabric, this fastening consisting of a wire 24 which is inserted through the coiled element and provided with loops 25 at certain intervals. Staples 26 are engaged between adjoining coils of the coiled element with the loops 25, and the outer ends of these staples are secured to the tape or fabric 27 by rivets or other suitable fastenings as indicated at 28.

Figs. 16 and 17 show another form of fastening comprising a wire 29, which is located in the fold of a doubled over tape 30 and provided at intervals with loops 31, projecting out through apertures in the tape 30 and inserted between coils of the coiled element. A wire or other flexible member 32 extends lengthwise within the coiled element and is engaged with the loops 31.

Another form of attachment is shown in Figs. 18 and 19 and consists of a wire 33 which is arranged at intervals with loops 34, projecting outwardly between coils of the coiled element and passed through eyelets in tabs 36. Instead of the tabs 36, a continuous piece of tape may be used, if desired.

I prefer to make the coiled element 3 cylindrical in form, as it is not only easier to manufacture, but it is also stronger than an element which is elliptical in cross section or otherwise flattened, a convenient manner of making such elements being disclosed in my application, Ser. No. 757,322, filed December 22, 1924. Moreover, the circular coils will not interfere with the operation of the slider and will interlock even when the waves are not in perfect alignment and will maintain a secure interlocking engagement when the interlocked coils are doubled over, that is, they will not slip out sidewise and become disengaged.

Figure 5:
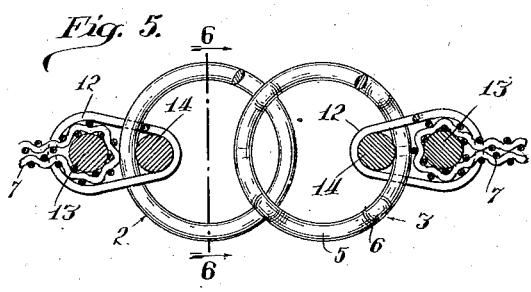
Fig. 5 is a view on the line 5—5 of Fig. 4, showing the plain coiled element interlocked with depressed wave formations of the other coiled element.
Figure 6:
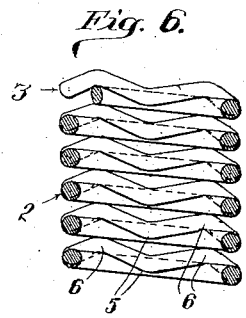
Fig. 6 is a sectional view on the line 6—6 of Fig. 5.
Figure 7:
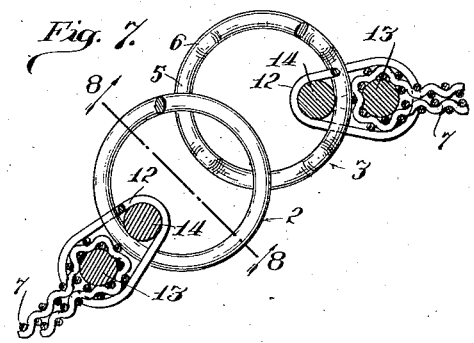
Fig. 7 is a view similar to Fig. 5, but showing the plain coiled element swung around the axis of the other coiled element and interlocking with upwardly extending wave formations of the latter element.
Figure 8:
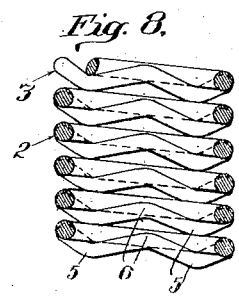
Fig. 8 is a sectional view on the line 8—8 of Fig. 7.

With the form of coiled fastener elements above described, it will be noted that there are no sharp bends in the wire, which would tend to weaken the coils, and moreover, since each coil of the element 3 has a plurality of wave-like formations, there are a plurality of points of interlocking engagement around each coil, and when the element 2 is swung around the element 3, the coils of the element 2 merely slide around out of engagement with the outermost waves 5 of the coils and interlock with the adjoining reverse waves 6 as shown in Figs. 6 and 7, thereby insuring a positive connection at all times. Furthermore, the wave-like formations of the element 3 afford irregularities in the coils at the point of attachment to the fabric or tape, which hold the coils in proper relative position with respect to the fabric or tape, and prevent turning or creeping of the element on the fabric or tape, and this tends to maintain the corresponding waves of the various coils in alignment.

While I have shown and described my invention in a preferred form, I am aware that various changes and modifications may be made without departing from the principles of my invention, the scope of which is to be determined by the appended claims.

I claim as my invention:

1. In a fastening device of the class described, the combination of a pair of elongated coiled elements, and a slider operable therealong for nesting the coils of one of the elements between the coils of the other element, one of said elements having the coils thereof provided with a circumferential series of reversely extending wave-like formations and having the corresponding wave-like formations of the various coils arranged in alignment lengthwise of the coiled element.

2. In a fastening device of the class described, the combination of a pair of elongated coiled elements, and a slider movable along the elements and operable in one direction to insert the coils of one of the elements between the coils of the other element and operable in the reverse direction to disengage the coils, one of said elements having each coil thereof provided with an interlocking bend which is offset toward one end of the fastening device and inserted into the other element and portions at each side of the interlocking bend being offset toward the other end of the fastening device and bridging spaced portions of a coil of the other element.

3. In a fastening device of the class described, the combination of a pair of elongated coiled elements, and a slider operable along the elements for nesting the coils of one of the elements between the coils of the other element, each coil of one of said elements having a circumferential series of uniform staggered deformations forming offsets at opposite sides of the coil and projecting alternately toward the opposite ends of the element.

4. In a fastening device of the class described, the combination of a plurality of elongated coiled elements, and a slider movable lengthwise thereof for nesting the coils of one of the elements between the coils of the other element, one of said elements having each coil provided with successive reversely arched portions forming offsets at opposite sides of the coil and projecting alternately toward opposite ends of the element.

5. In a fastening device of the class described, the combination of two opposed series of wire fastener elements secured respectively to the edges of material bordering a gap or opening and a slider operable along the two series of elements for engaging and disengaging same, the fastener elements of each series being of loop-like form and so spaced as to receive between them the elements of the other series and to provide a locking effect by the cumulative action of neighboring elements when the elements are interengaged, individual elements of one of said series having successive portions of the wire thereof offset alternately toward opposite ends of the series, and individual elements of the other of said series having a portion of the wire thereof seated in a pair of similarly offset portions and behind an intermediate reversely offset portion of an opposed element.

6. In a fastening device of the class described, the combination of a series of loop-like wire elements mounted in spaced relation on and projecting from the edge of a flexible support, each of said elements having a plurality of indentations and projections at each side thereof.

7. In a fastening device of the class described, the combination of opposed series of loop-like wire elements and a slider operable therealong for interlocking and releasing same, a pair of elongated flexible members extending along each series of elements and located respectively at the interior and exterior thereof, and a mounting tape to which said flexible members are secured.

8. In a fastening device of the class described, the combination of opposed series of loop-like wire elements and a slider operable therealong for interlocking and releasing same, a pair of elongated flexible members extending along each series of elements and having portions of the loop-like wire elements interposed therebetween and a folded tape with loops thereon at the folded edge which engage between the fastener elements and embrace the pair of flexible members.

GEORGE W. BLAIR.